(12) United States Patent
Andersen et al.

(10) Patent No.: US 12,209,572 B2
(45) Date of Patent: Jan. 28, 2025

(54) METHOD FOR REPAIRING A ROOT OF A ROTOR BLADE OF A WIND TURBINE

(71) Applicant: Siemens Gamesa Renewable Energy A/S, Brande (DK)

(72) Inventors: Erik Dahl Andersen, Vildbjerg (DK); Kristian Fjordgaard, Vejle (DK); Kenneth Oestergaard Mortensen, Vejle (DK); Winnie Noeddebo, Herning (DK); Christian Pausgaard, Vejle (DK); Michael Gaasvig Seremet, Vejle (DK); Soeren Vinther, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/579,891

(22) Filed: Sep. 24, 2019

(65) Prior Publication Data

US 2020/0102938 A1  Apr. 2, 2020

(30) Foreign Application Priority Data

Sep. 28, 2018 (EP) .................................... 18197714
Feb. 19, 2019 (EP) .................................... 19158010

(51) Int. Cl.
*F03D 80/50* (2016.01)
*B29C 73/04* (2006.01)
*B29C 73/26* (2006.01)

(52) U.S. Cl.
CPC .............. *F03D 80/50* (2016.05); *B29C 73/04* (2013.01); *F03D 80/502* (2023.08); *B29C 2073/264* (2013.01); *F05B 2230/80* (2013.01)

(58) Field of Classification Search
CPC .......... F03D 80/50; F03D 1/0658; F03D 1/06; F03D 80/502; F03D 80/507;
(Continued)

(56) References Cited

U.S. PATENT DOCUMENTS 3,740,820 A * 6/1973 Tarves, Jr. ................ B23P 6/04
29/527.1
8,769,815 B2 * 7/2014 Shiraishi ................. F03D 80/50
29/244
(Continued)

FOREIGN PATENT DOCUMENTS

CN 101518842 A 9/2009
CN 101687368 A 3/2010
(Continued)

OTHER PUBLICATIONS

European Search Report and Written Opinion of the European Searching Authority issued Sep. 10, 2019 for Application No. 19158010.9.
(Continued)

*Primary Examiner* — Woody A Lee, Jr.
*Assistant Examiner* — Jesse M Prager
(74) *Attorney, Agent, or Firm* — Schmeiser, Olsen & Watts LLP

(57) ABSTRACT

Provided is a method for repairing a root of a rotor blade of a wind turbine, the root including several bores for receiving a bolt and extending form the root front surface into the blade, wherein at least a part of the front surface blade material surrounding the bore is removed using a removing tool and that at least one shim plate is attached to the processed front surface surrounding the bore.

18 Claims, 6 Drawing Sheets

(58) Field of Classification Search
CPC .......... F05B 2230/80; B29L 2031/085; B29C 73/04; B29C 2073/264; B29C 73/26; B29C 2073/262; B23P 6/00; F01D 5/147
See application file for complete search history.

(56) References Cited

U.S. PATENT DOCUMENTS

| | | | |
|---|---|---|---|
| 9,227,278 B2 * | 1/2016 | Sullivan | .................. B23P 6/007 |
| 2007/0084906 A1 * | 4/2007 | Vargas | .................. B23K 33/004 |
| | | | 228/119 |
| 2008/0000193 A1 | 1/2008 | Holland et al. | |
| 2008/0193280 A1 | 8/2008 | Addis | |
| 2009/0220343 A1 | 9/2009 | Dimascio et al. | |
| 2010/0000090 A1 * | 1/2010 | Moss | ........................ B23P 6/04 |
| | | | 29/888.01 |
| 2010/0140217 A1 | 6/2010 | Weisser | |
| 2010/0158661 A1 | 6/2010 | Dawson et al. | |
| 2011/0036482 A1 * | 2/2011 | Stenbaek | ................. B29C 73/10 |
| | | | 156/98 |
| 2013/0081589 A1 * | 4/2013 | Ostein | ....................... F02B 3/06 |
| | | | 29/700 |
| 2013/0115091 A1 | 5/2013 | Bruck et al. | |
| 2014/0223737 A1 | 8/2014 | Kell et al. | |
| 2015/0354531 A1 | 12/2015 | Kratmann | |
| 2017/0136556 A1 | 5/2017 | Clossen-Von Lanken Schulz et al. | |
| 2017/0167506 A1 | 6/2017 | Pesce et al. | |
| 2018/0149078 A1 | 5/2018 | Sakamoto et al. | |
| 2018/0252200 A1 * | 9/2018 | Murugappan | ......... F03D 1/0658 |
| 2019/0264660 A1 * | 8/2019 | Garcia De La Pena Razquin | ...... F03D 80/50 |

FOREIGN PATENT DOCUMENTS

| | | | | |
|---|---|---|---|---|
| CN | 101903162 A | 12/2010 | | |
| CN | 202431457 U | 9/2012 | | |
| CN | 102909519 A | 2/2013 | | |
| CN | 103071963 A | 5/2013 | | |
| CN | 103484851 A | 1/2014 | | |
| CN | 103889648 A | 6/2014 | | |
| CN | 103945978 A | 7/2014 | | |
| CN | 105275739 A | 1/2016 | | |
| CN | 105798405 A | 7/2016 | | |
| CN | 106994528 A | 8/2017 | | |
| CN | 107614847 A | 1/2018 | | |
| CN | 107804004 A | 3/2018 | | |
| EP | 0484836 A1 | 5/1992 | | |
| EP | 2623771 A1 | 8/2013 | | |
| EP | 2674243 A2 | 12/2013 | | |
| EP | 2764949 A2 | 8/2014 | | |
| EP | 3178601 A1 | 6/2017 | | |
| GB | 2569294 A | * | 6/2019 | ............. B23P 6/002 |
| JP | H08134802 A | 5/1996 | | |
| WO | 2013168072 A1 | 11/2013 | | |
| WO | WO 2018042063 A1 | 3/2018 | | |

OTHER PUBLICATIONS

Chinese Office Action for Application No. 201910923186.0, dated Apr. 6, 2021.
Editorial Board: "Chemical plant machinery manual Pipeline maintenance and equipment management"; Nov. 30, 1989; pp. 830-831; ISBN: 7-5025-0345-5; 1989.

* cited by examiner

METHOD FOR REPAIRING A ROOT OF A ROTOR BLADE OF A WIND TURBINE

CROSS-REFERENCE TO RELATED APPLICATIONS

This application claims priority to European Application No. 19158010.9, having a filing date of Feb. 19, 2019 and European Application No. 18197714.1, having a filing date of Sep. 28, 2018, the entire contents both of which are hereby incorporated by reference.

FIELD OF TECHNOLOGY

The following relates to a method for repairing a root of a rotor blade of a wind turbine, the root comprising several bores for receiving a bolt and extending from the root front face into the blade.

BACKGROUND

Rotor blades are attached to a hub usually by means of blade bolts. If the rotor blade can be pitched the blade is attached to a bearing respectively one of the bearing rings, with the bearing being also attached to the hub with the other bearing ring. The bolts used for mounting the blade are inserted into respective bores provided in the root front surface, which bores extend parallel to each other into the blade. Each bolt is screwed into a threaded bore or a holding bolt which is fixed to the blade and which extends transvers to the bore. With these bolts the blade can be firmly fixed to the hub respectively the bearing.

The blade bolts are subjected to wear, which is quite frequently a symptom of wear of the blade root itself. Wear may occur by leaking grease or lubricant from the sealing of the bearing, which leakage ingresses in the mounting area, thus the root front surface and the bolts. The wear of the bolts may finally result in a breakage.

As depicted above, due to the direct attachment of the blade respectively the root front surface to the bearing the ingress of leaking material negatively influences at first the blade root material. Wear was seen from 0.3-1.0 mm leading to increased stress on the blade bolts in this area. Even if a bearing reinforcement blade protects the blade root, wear may occur in this area visually as a collar around the bolt bore in the root, where the bearing reinforcement blade protects the blade root.

SUMMARY

An aspect relates to a method for repairing a root in case of wear.

For solving the problem embodiments of the invention proposes a method for repairing a root of a rotor blade of wind turbine, the root comprising several bores for receiving a bolt and extending from the root front surface into the blade, which method is characterized in that at least a part of the front surface blade material surrounding the bore is removed using a removing tool and that at least one shim plate is attached to the processed front surface surrounding the bore.

According to embodiments of the invention the root material at the root front surface is partially removed by processing the front surface with a removing tool. This allows to remove the material surrounding the bore and allows especially to remove the material in areas where wear is given, while areas which are still intact do not need to be processed.

After removing the worn material at least one shim plate is attached to the processed area of the front surface, which shim plate is designed to surround the bore.

The inventive method allows for an easy, fast and, if necessary, only local repair of the root front surface and providing a new surface area with the attached shim plate. Also, a tension area at the root may be secured by means of the shim plate, which, as depicted above, surrounds the bolt bore. This is especially advantageous when the inventive repair is done together with an exchange of a blade bearing seal, because any leakage may be stopped and any further leakage, which could enter the bore respectively the bolt in the front surface region may be prevented. Thus, embodiments of the invention not only allow for repairing respectively restoring a correct surface for attaching the blade root to the hub respectively the sealing but also for tensioning the bolts and stopping further leakage and thus any resulting wear problems.

According to embodiments of the invention a removing tool is used for processing the root front surface. During this processing state only an area surrounding one bore may be processed with the tool. This is possible, especially when wear is only given in a smaller local area around certain bores. During this process for example a ring-shaped area of root surface material around the bore is removed, thus a kind of ring-shaped recess of groove is realized for accommodating a ring-shaped shim plate. In case two or more neighbouring hole areas need to be processed, it is possible that the material is removed again in a ring-shaped form, but the respective ring-shaped grooves or reaseses overlap each other. In this case for example ring shaped shim plates may be used, which have an adapted outer circumference with one half-moon recess into which the neighbouring plate engages.

In an alternative to the above mentioned single processed area, it is possible that an area surrounding several bores is processed. This may be done if the area surrounding several neighbouring bores is worn in order to accelerate the material removal stage.

The shim plate or the shim plates, which are used, may have different shapes. For example, a shim plate may be used having only one opening, which shim plate surrounds only one bore. This shim plate has a ring shape respectively is disc-like with the central hole. In an alternative a shim plate having more than one opening, surrounding more than one bore may be used. This elongated shim plate is used when a larger material area at the root front surface is removed, which larger shim plate covers the whole area. In this case only one shim plate needs to be attached, but not several shim plates.

A shim plate, having only one opening, may have a ring form, an oval form, a rectangular or polygonal form. A ring-shaped shim plate is used, which is easy to produce, and which may also easily be inserted into the circular groove or recess in a form fit, an embodiment, to which is referred afterwards.

If a shim plate having more than one opening is used, this shim plate has a bended form according to the radius of the root front surface in order to follow the curvature of the root. The shim plate may have a rectangular or polygonal form, it may also have a free form or may be provided with round ends, especially when a rectangular or polygonal form is used. In case a free form is used, this free form may for example comprise ring shaped sections, in which the opening is provided, which sections are connected via bridging bars or the like.

While it is possible to remove the root material completely around the bore respectively to the bore, it is in an alternative also feasible to process the root front surface that a material ring of unprocessed surface material remains around the bore and that the opening in the or each shim plate has at least the same or a larger diameter as the remaining material ring. This remaining material ring is an area which avoids removed material falling into the bore.

As mentioned above, the shim plate is attached to the processed root front surface, with the opening of the shim plate being concentric to the bore, so that the shim plate surrounds the bore. While it is preferable to arrange only one layer of a shim plate at the front surface, it is also possible to arrange two or more shim plates stacked above each other. This for example allows to adjust the total height of the shim plate stack in order to adjust it to the depth of the recess or area where the material was removed. The shim plates may be provided in a set comprising several shim plates having different thickness, for example within a range of 0.1-10.0 mm, so that it is possible to very precisely adjust the stack height.

According to a preferred embodiment of the invention it is possible to insert the or each shim plate with a form fit into the processed route front surface. As already mentioned above, a rotating removal tool, for example a milling tool, is used, which allows to process a circular ring-shaped groove or recess around the bore. In this case the or each shim plate may easily be form fitted into this recess by using a round, disc-like or ring-like shim plate. In case the processed ring-shaped areas slightly overlap the form fit shim plates have an adapted outer circumference with one half-moon recess into which the neighbouring plate engages. This form fit allow for a slight fixation of the respective shim plate, which is additionally also fixed to the root by means of a fixation device, for example a screw, which is screwed into the root front surface. It may also be fixed by means of a glue or the like.

The shim plate or the stacked shim plates are arranged flush with the unprocessed front surface. This secures that, after the final repair, the root front surface has a uniform surface respectively a uniform plane. It is also possible that the shim plate or the plate stacked very slightly extents above the unprocessed surface, while it should not be lower than the surface, as in this case an opening remains into which again any harming lubricant or the like may enter.

The depth, to which the root front surfaces is processed, may be within the range of 0.1-10 mm relative to the unprocessed root front surface. Also, the or each shim plate may have a thickness of 0.1-10 mm, while the thickness of a single shim plate may be smaller than the processed depth due to the possibility to stack several shim plates.

As already mentioned above, it is possible to fix the shim plate or the stacked shim plate when being attached at the root by means of a fixation device, even if no form fit is given. This fixation device may be, as mentioned, for example a screw or an adhesive or the like.

In a preferred embodiment a shim plate having a sealing provided at least at the side facing away from the root front surfaces used. This seal is attached to the surface of the hub or the bearing. As this sealing surrounds the opening of the shim plate it also surrounds the bore and thus is a sealing area which additionally prevents any harming lubricant from entering the area of the bolt. It is also possible to provide both sides of the sealing plate with respective sealing means.

In case several shim plates are stacked, at least the outermost shim plate is provided with the sealing, while also sealings may be provided at the other shim plates for providing respective sealing levels also within the stack.

A sealing may be realized in form of an O-ring when ring or disc-shaped sealing plates are used. These sealing rings are arranged close to the outer circumference of the respective shim plate. If larger shim plates surrounding several holes are used, also an O-ring, which is arranged close to the outer circumference, may be used. In an alternative to such an O-ring, also a paste-like, curable sealing means may be used. A third alternative is a sealing tape which is attached to the respective plate. For attaching the respective sealing, no matter what it is, a small groove may be provided in the surface of the sealing plate, into which groove the sealing means is attached.

The shim plate may be of various material, for example metal or an appropriate polymer (plastic). Also, a shim plate made of a composite material, for example comprising metal and polymer layers or a combination of a metal and a fibre material or the like may be used, while also pure fibre material plates may be used.

As already mentioned above, the removal tool is used for removing the worn surface material. A rotating tool like a milling tool is used. This rotating tool allows an easy preparation of the respective mentioned circular grooves or recesses surrounding a bore, or, when the working radius of the milling tool is large enough, for processing also larger areas of the front surface.

The removing tool may be attached to the root by means of a clamping mechanism engaging at the inner and outer surface of the root. This engaging mechanism may comprise holding brackets or clamping arms, which are firmly attached or clamped against the walls of the root for firmly fixing the tool. In an alternative it is also possible that the tool is fixed to the root by means of one or two bolts inserted into bores adjacent to the area to be processes. In this embodiment respective bolts are screwed into the transverse fixation bolts, into which, when mounted, the blade bolts are screwed.

In another embodiment a removing tool comprising a tool frame which is to be attached to the plate and an exchangeable tool head is used. This allows to simply change the tool head comprising the milling part for switching from a tool processing a smaller area like only an area around one hole to a tool used for processing larger areas.

Finally, it is preferably to use a tool with a processing dust removal device like a suction device or a kind of reservoir into which the dust accumulates.

Aside the method for repairing the root embodiments of the invention also refers to a rotor blade for a wind turbine, with a root comprising several bores for receiving a bolt and extending from the root front surface into the blade. This rotor blade is characterized in that the root is repaired according to the method depicted above with at least one shim plate arranged at the root front surface.

BRIEF DESCRIPTION

Some of the embodiments will be described in detail, with reference to the following figures, wherein like designations denote like members, wherein.

DETAILED DESCRIPTION

Figure 1:
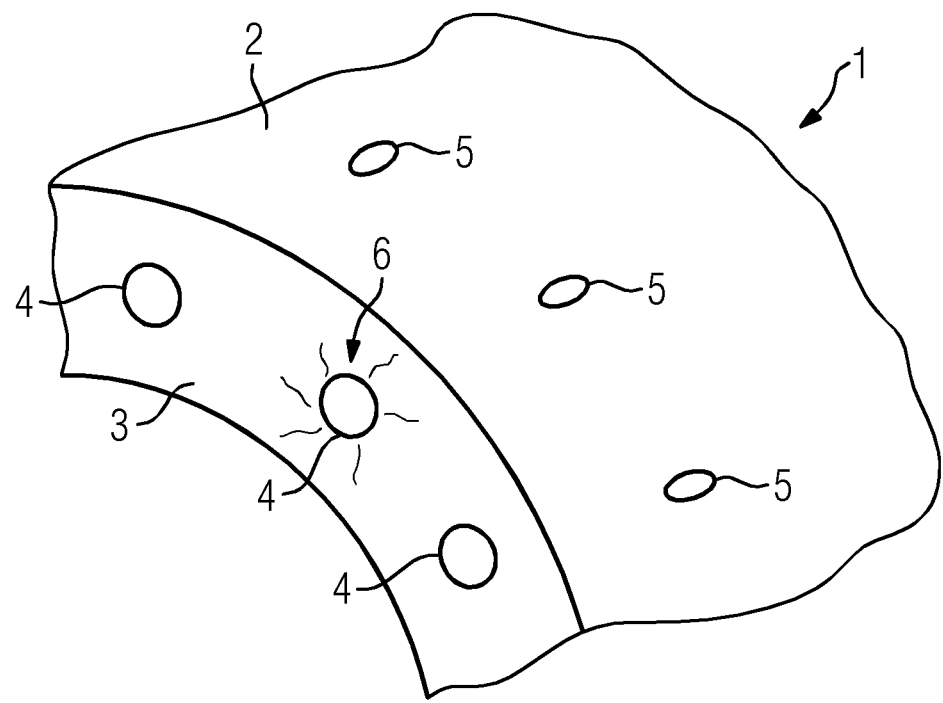
FIG. 1 depicts a perspective partial view of a rotor blade showing the root and the root front surface.

FIG. 1 shows a principle sketch of a rotor blade 1 for a wind turbine, comprising a root 2, which root 2 is attached to the hub respectively a pitch bearing arranged at the hub.

The root 2 comprises a root front surface 3, where several bores 4 are provided, into which respective bolts are inserted used for fixing the rotor blade 1 to the hub respectively the bearing, which bolts are screwed in respective threaded bores of fixation bolts 5 fixed to the root 2 and extending transverse to the respective bores 4.

In an area 6 around the bore 4 shown in the middle of the depicted example the front surface 3 respectively the surface material is worn, as depicted by the lines resembling to some kind of cracks or the like. This area is harmful, as a lubricant or like grease or the like from the pitch bearing, which leaks the bearing respectively the bearing seal, may ingress this area 6 and thus may further wear this area resulting also in wear of the bolt, which may rust and, in worst case, finally break. To repair this area 6 a removal tool, which is disclosed in further detail later on, is used.

Figure 2:
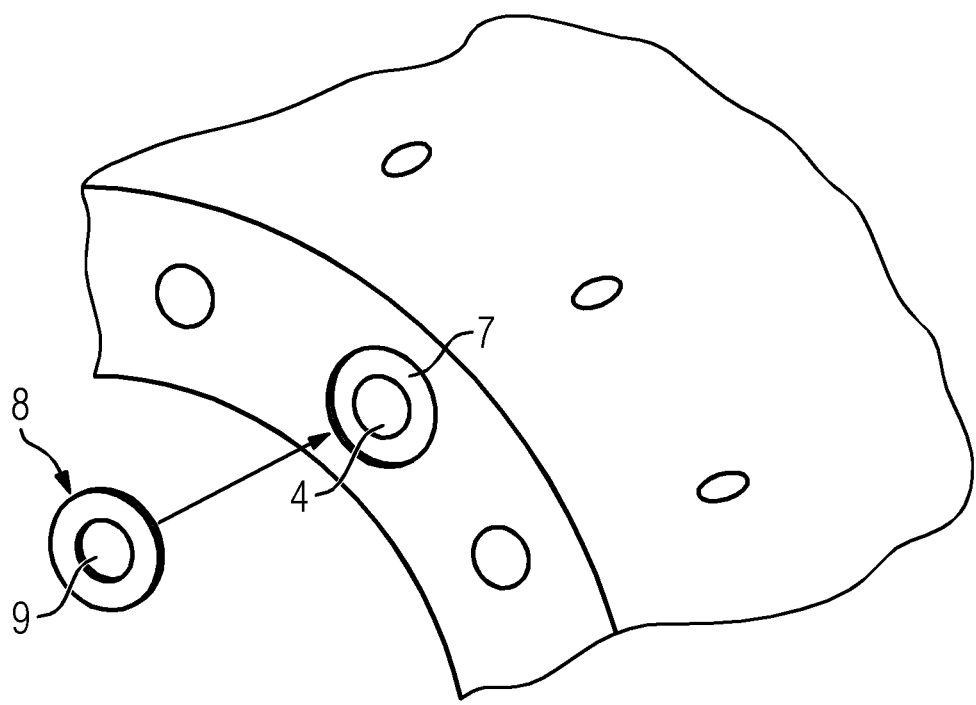
FIG. 2 depicts the arrangement of FIG. 1 after removal of the surface material surrounding a hole and a shim plate which is to be attached at the front surface.

With this tool a circular groove or recess 7, see FIG. 2, surrounding the bore 4 is removed. The diameter of the recess 7, and thus the working zone of the removal tool, a milling tool, is adjusted to the dimension of the area 6.

After removal of the worn material a shim plate 8 having in this embodiment also a ring shaped or disc shaped form is inserted into the recess 7. The shim plate 8 comprises an opening 9 which has at least the same diameter as the bore 4, but may have also a slighter larger diameter, as it is possible to process the root front surface 3 in a way that a material ring, which is unprocessed, may remain surrounding the bore 4.

Nevertheless, after providing the recess 7 the shim plate 8 is inserted into the recess 7, with the opening 9 being concentric to the bore 4. Due to the corresponding geometry the shim plate 8 is inserted in a form fit manner in the recess 7. It may be fixed in the recess 7 with the fixation means like a screw or an adhesive or the like.

Figure 3:
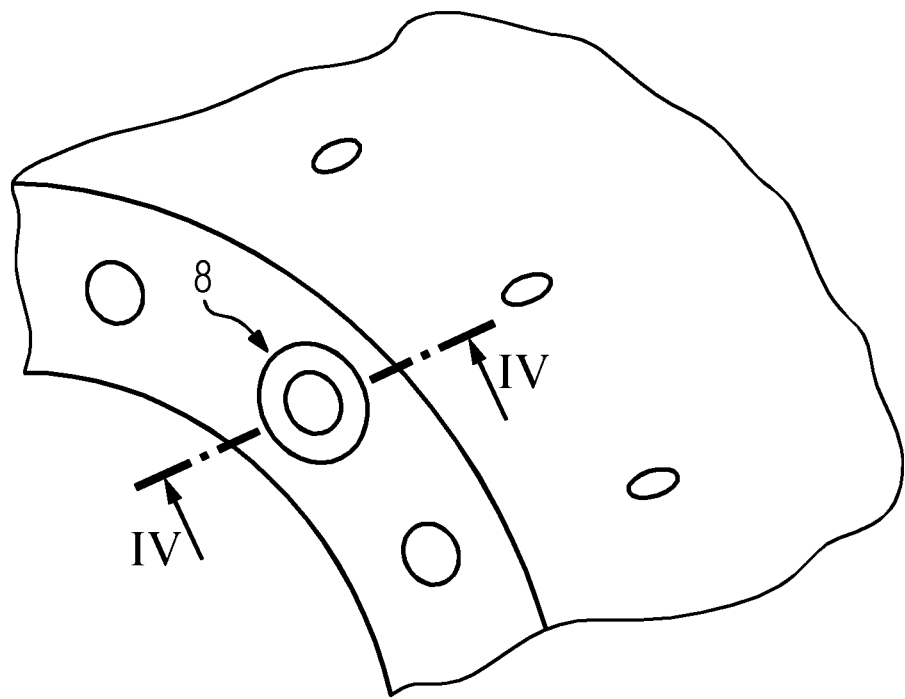
FIG. 3 depicts the arrangement of FIG. 2 with the attached shim plate.
Figure 4:
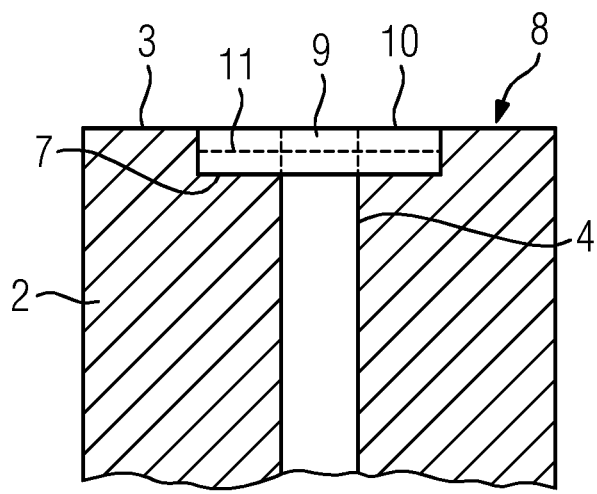
FIG. 4 depicts a sectional view along the lines IV-IV in FIG. 3.

FIG. 4 shows a sectional view of the blade root 2 along the lines IV-IV in FIG. 3. It shows that the shim plate 8 is inserted with a form fit in the recess. The depth of the recess 7, which may be between 0.1-10 mm, and the height of the shim plate 8 are the same, so that the surface 10 of the shim plate 8 flushes with the unprocessed root front surface 3.

FIG. 4 shows a dashed line 11 extending through the shim plate 8. This line shall indicate, that it is also possible to stack two separate shim plates 8 above each other, in case of need also more than two shim plates, having the same geometry. The shim plates 8 may have the same thickness or a varying thickness. It is possible to provide a whole set of shim plates having varying thicknesses, from a very low thickness of for example 0.1 mm to a remarkably high thickness of 10 mm. With this set it is possible to precisely adjust the overall height of the shim plate stack in order to flush the surfaces 10 and 3. The stacked shim plates may also be fixed to each other or with one common fixation screw.

FIG. 4 shows an embodiment of a rotor blade 1 with a root 2 and a root front surface 3, in which respective bores 4 are provided. In this embodiment the removal or milling tool has a remarkably large working diameter, which is indicated by the dashed lines 12. The working diameter overlaps. This allows for producing a relatively large recess 7 extending or surrounding several bores 4, in the shown embodiment it covers three bores 4.

Figure 5:
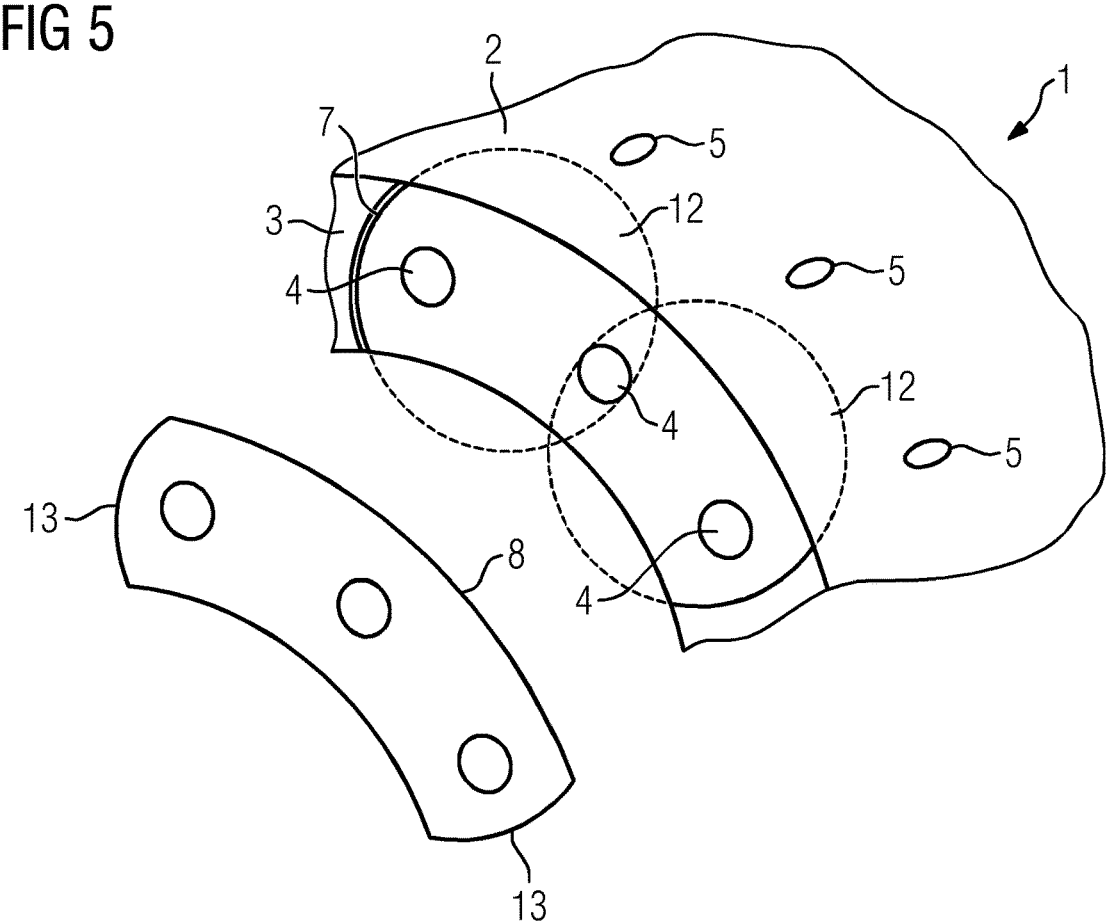
FIG. 5 depicts an arrangement according to FIG. 1 after removal of a larger surface material area and a shim plate of another embodiment covering the larger area.

FIG. 5 also shows a shim plate 8 of another embodiment, which is formed according to the geometry of the recess 7 shown in FIG. 4. It is, according to the curvature of the root 2, bent and has rounded edges 13 corresponding to the edge geometry of the recess 7.

Similar to the previously described embodiment this shim plate 8 is inserted into the recess 7 and fixed by screwing or gluing or the like. It covers the whole area respectively recess 7, thus repair the worn surface area surrounding several bores 4.

Also, in this embodiment it is possible to stack several identically shaped shim plates 8, as already mentioned to FIG. 4.

Figure 7:
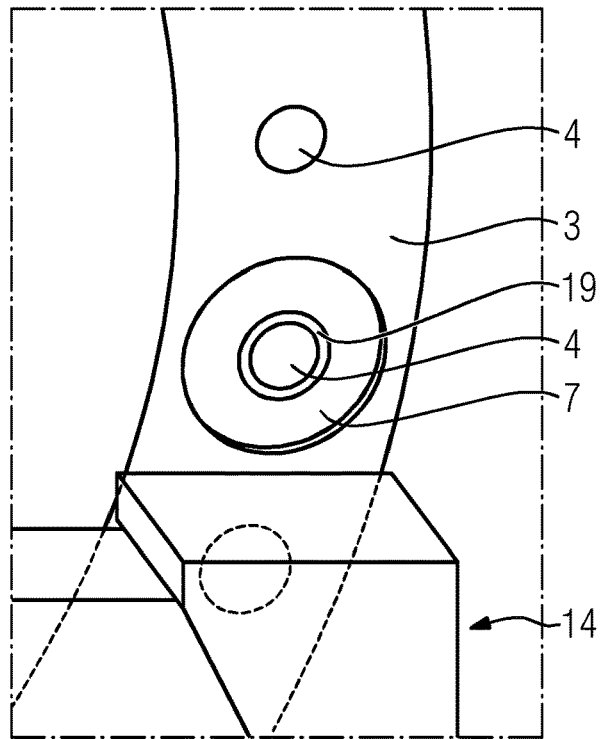
FIG. 7 depicts a partial view of the root with material being removed around one bore.

FIG. 7 shows a principle sketch of a removal tool 14, here a milling tool, which is attached to the root 2 and which is used for preparing a recess according to the embodiment of FIG. 2. The removal tool 4 comprises a tool frame 15 which is, see FIG. 8, fixed to the root 2 by means of bolts 16 which are inserted into bores 4 adjacent to the bore 4 which is processed. These bolts 16 are screwed into the respective fixation bolts 5.

Figure 6:
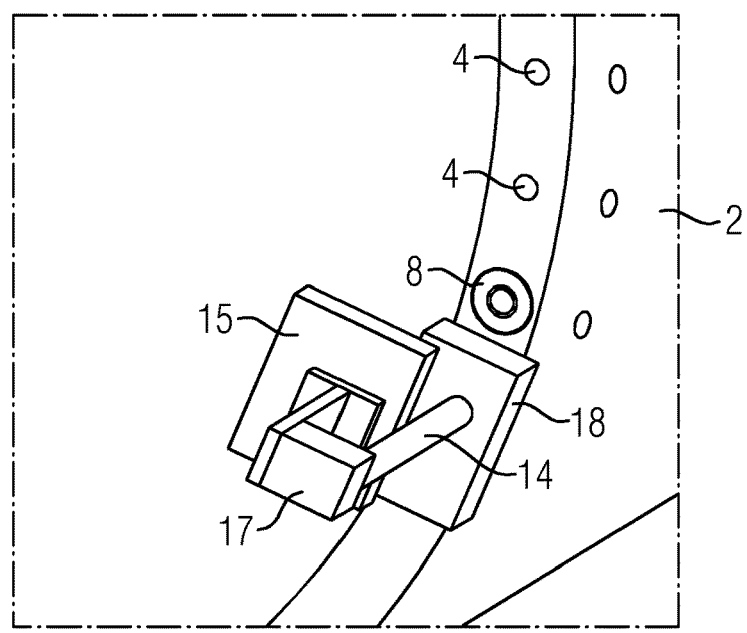
FIG. 6 depicts a principle drawing of a removal tool attached to the blade root used for removing material according to the arrangement shown in FIG. 2.
Figure 8:
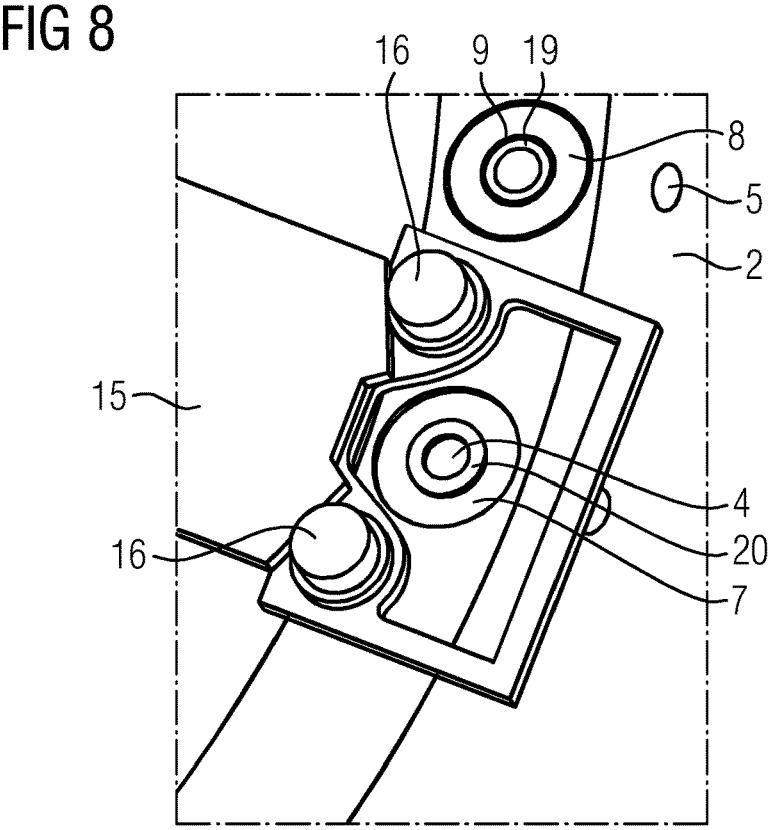
FIG. 8 depicts a perspective partial view with a tool frame of the removing tool fixed to the root after removing surface material and with one shim plate already attached.

FIG. 8 shows only the tool frame 15 but not the tool head 17, which is also shown in FIG. 6. The tool head 17 comprises a processing dust removal device 18, here in form of a box, to which for example a suction device like a vacuum cleaner may be attached. This is to avoid any processing dust falling in the processed bore 4.

As the tool head 17 is removeable from the tool frame 15 it is possible to change the tool head if need be, thus using a tool head which provides recesses according to FIG. 2 or change the tool head 17 to a head with a larger working diameter for preparing recesses according to FIG. 5.

FIG. 7 shows a front view of the root front surface 3 showing a bore 4 in the unprocessed root front surface 3 and a bore 4 with a processed recess 7 surrounding it. In this embodiment a remaining ring 19 of unprocessed surface material surrounds the bore 4. The shim plate 8, one of which is shown in FIG. 8, form fits into this recess 7 and therefore has a diameter of its opening 9 which corresponds to the outer diameter of the remaining material ring 19.

In the situation shown in FIG. 7 the removal tool 14 is attached to the root 2 and processes another bore 4.

The result of these processing stages is shown in FIG. 8, with the recess 7 milled around the bore 4. For preparing the remaining material ring 19 a sleeve 20 may be used which is inserted into the bore 4 and which defines the outer diameter of the material ring 19 respectively covers it while the recess 7 is milled.

Figure 9:
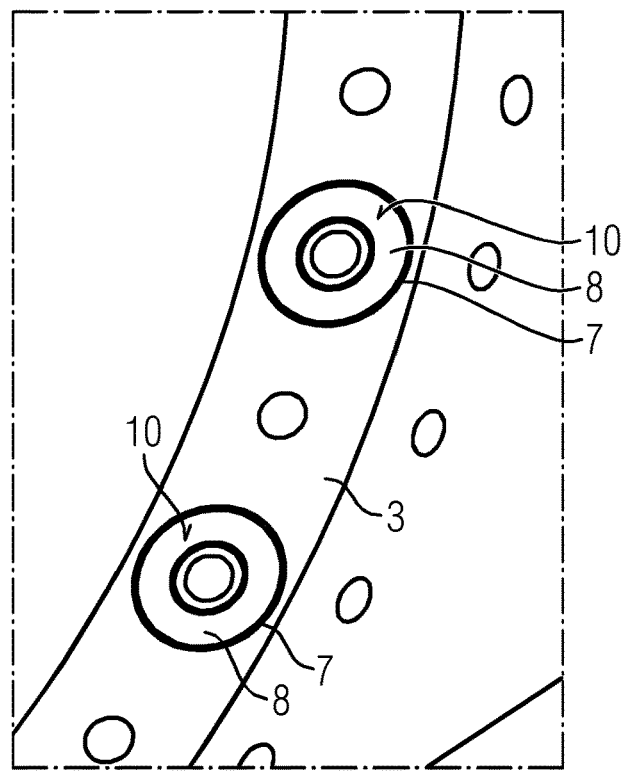
FIG. 9 depicts the arrangement of FIG. 8 after attaching a second shim plate.

FIG. 9 shows the root front surface 3 with two shim plates 8 form fitted into the respective recesses 7. As mentioned before the surfaces 10 of the respective shim plates 8 flush with the front surface 3 or very slightly extend over this front surface.

When the repair is finished the rotor blade 1 can be remounted. After attaching it to the hub respectively the bearing the unprocessed root front surface 3 and the shim plate surfaces 10 are tightly fixed against the corresponding hub or bearing surface. As the shim plate surface 10 is new and completely unworn, any ingress of harming lubricant like grease, water or the like to the secured bore 4 is avoided.

Figure 10:
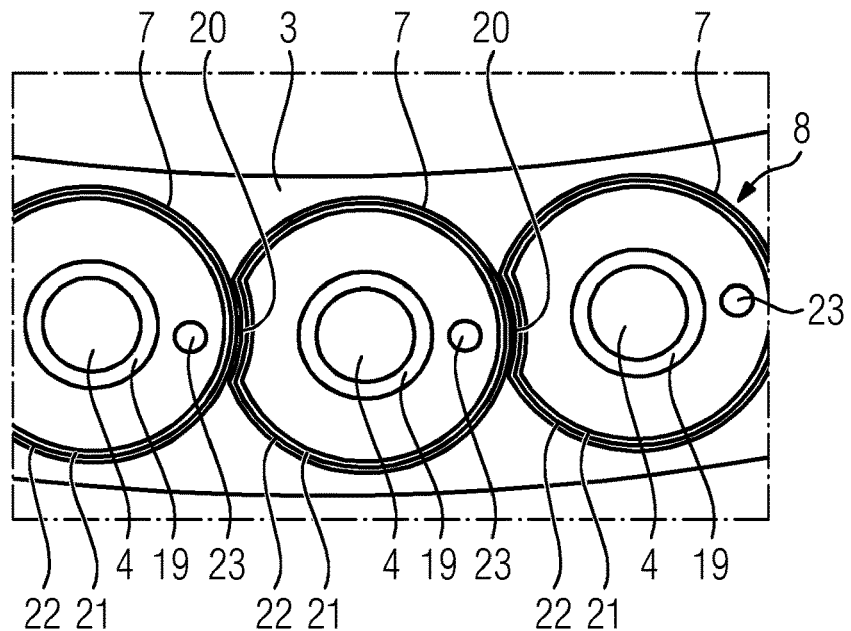
FIG. 10 depicts a view of the front surface with three shim plates engaging each other and comprising sealing means.

FIG. 10 shows another embodiment of shim plate 8. FIG. 10 shows the root front surface 3 with three bores 4 and with three recesses 7 provided in the root front surface 3 leaving a remaining material ring 19 around the respective bore 4. As shown the recesses 7 slightly overlap. For form fitting the respective shim plates 8 it is necessary to adapt their geometry. Due to the overlap each shim plate 8 comprises a half moon like recess 20 into which the adjacent shim plate 8 engages.

Furthermore, each shim plate 8 comprises a sealing 21, here in form of an O-ring which is inserted into a respective groove 22 provided close to the outer circumference of the respective shim plate 8. This sealing 21 abuts the respective adjacent surface of the hub respectively the bearing and tightly seals the area of the respective bore 4 to the surrounding avoiding any ingress of harming substances.

Aside an O-ring it is possible to use a paste-like, curable sealing means filled in the respective groove 22 or a sealing tape or the like.

FIG. 10 also shows respective fixation means 23 in form of screws which extend through respective openings in the respective shim plates 8 and which are screwed in the bottom of the respective recess 7 for fixing the shim plate 8. Aside such a screw also an adhesive may be used.

Figure 11:
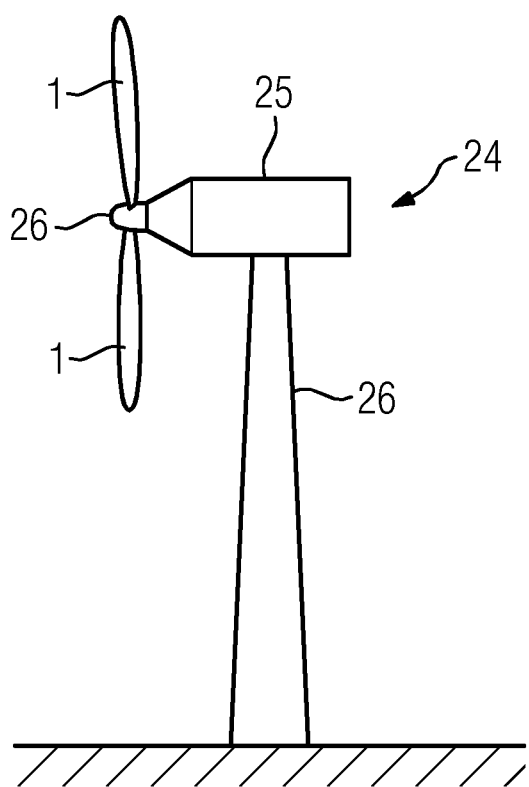
FIG. 11 depicts a wind turbine comprising an inventive rotor blade.

Finally, FIG. 11 shows a wind turbine 24, comprising a nacelle 25 arranged at a tower 26. The nacelle 25 comprises a hub 26, to which several inventive rotor blades 1 are attached, after they were repaired according to the inventive method.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for repairing a root of a rotor blade of a wind turbine, the root comprising a plurality of bores for receiving a bolt and extending from a root front surface into the rotor blade, the method comprising:
   removing a worn portion of the root front surface to form a recess surrounding at least one bore of the plurality of bores, using a removal tool;
   attaching at least one shim plate to the recess surrounding the at least one bore of the plurality of bores, the at least one shim plate having an opening that corresponds to the at least one bore, wherein the at least one shim plate has a groove in a surface of the at least one shim plate, and a sealing ring is disposed within the groove, such that the sealing ring is provided at least at a side facing away from the root front surface, proximate an outer circumference of the at least one shim plate, further wherein the sealing ring is configured to attach to a hub or bearing of the wind turbine; and
   as a function of the attaching, sealing the at least one bore from lubricant entering an area of the bolt, wherein the sealing ring surrounds the at least one bore at the recess on the root front surface;
   wherein a shape of the at least one shim plate inserted into the recess is unchanged as a function of repairing the root.

2. The method according to claim 1, wherein only an area surrounding the at least one bore is processed with the removal tool, or that an area surrounding multiple bores of the plurality of bores is processed.

3. The method according to claim 1, wherein the at least one shim plate, having the opening, is in a ring form, an oval form, a rectangular form, or a polygonal form, or that the at least one shim plate, having more than one opening, is in a bended form according to a radius of the root front surface and with a rectangular or polygonal or free form or with rounded ends.

4. The method according to claim 1, wherein the root front surface is processed such that a material ring of unprocessed surface material remains around each of the plurality of bores and that the opening in the or each shim plate has at least the same or a larger diameter as the corresponding material ring.

5. The method according to claim 1, wherein only one layer of the at least one shim plate is attached.

6. The method according to claim 1, wherein the at least one shim plate is inserted with a form fit into the recess at the processed root front surface.

7. The method according to claim 5, wherein the at least one shim plate is arranged flush with the adjacent, unprocessed root front surface.

8. The method according to claim 1, wherein the root front surface is processed to a depth of 0.1-10 mm relative to the unprocessed root front surface, and that the at least one shim plate used has a thickness of 0.1-10 mm.

9. The method according to claim 5, wherein the at least one shim plate is fixed to the root by means of a fixation device.

10. The method according to claim 1, wherein the sealing ring is an O-ring.

11. The method according to claim 1, wherein the at least one shim plate made of metal, polymer, a composite material or a fiber material is used.

12. The method according to claim 1, wherein the removal tool is a milling tool.

13. The method according to claim 1, wherein the removal tool is attached to the root by a clamping mechanism engaging at an inner surface and an outer surface of the root, or that the removal tool is fixed to the root by means of one or two bolts inserted into the plurality of bores adjacent to the area to be processed.

14. The method according to claim 1, wherein the removal tool comprising a tool frame which is to be attached to the blade and an exchangeable tool head is used, and/or that that the removal tool with a processing dust removal device is used.

15. A rotor blade for a wind turbine, with a root repaired according to the method of claim 1.

16. A method for repairing a root of a rotor blade of a wind turbine, the root comprising a plurality of bores for receiving bolts and extending from a root front surface into the rotor blade, the method comprising:
- removing a first worn portion of the root front surface to form a first recess surrounding a first bore of the plurality of bores, using a removal tool;
- removing a second worn portion of the root front surface to form a second recess surrounding a second bore of the plurality of bores, using the removal tool, without overlapping with the first recess;
- attaching a first shim plate to the first recess surrounding the first bore, the first shim plate having an opening that corresponds to the first bore, wherein the first shim plate has a groove in a surface of the first shim plate, and a sealing ring is disposed within the groove such that the sealing ring is provided at least at a side facing away from the root front surface, proximate an outer circumference of the first shim plate;
- as a function of the attaching the first shim plate, sealing the first bore from lubricant entering an area of one of the bolts received within the first bore, wherein the sealing ring surrounds the first bore at the first recess on the root front surface;
- attaching a second shim plate to the second recess surrounding the second bore without contacting the first shim plate attached to the first recess, the second shim plate having an opening that corresponds to the second bore, wherein the second shim plate has a sealing ring provided at least at a side facing away from the root front surface, proximate an outer circumference of the second shim plate; and
- as a function of the attaching the second shim plate, sealing the second bore from lubricant entering an area of another of the bolts received within the second bore, wherein the sealing ring of the second shim plate surrounds the second bore at the second recess on the root front surface;

wherein a shape of the first shim plate attached to the first recess and the second shim plate attached to the second recess remains the same during the method.

17. The method according to claim 1, wherein the sealing ring of the first shim plate is an O-ring.

18. A wind turbine comprising:
at least one repaired rotor blade, the at least one repaired rotor blade comprising a root with a plurality of bores for receiving a bolt and extending from a root front surface into the root, wherein the at least one repaired rotor blade is repaired by:
- removing a worn portion of the root front surface to form a recess surrounding at least one bore of the plurality of bores, using a removal tool;
- attaching at least one shim plate to the recess surrounding the at least one bore of the plurality of bores, the at least one shim plate having an opening that corresponds to the at least one bore, wherein the at least one shim plate has a groove in a surface of the at least one shim plate, and a sealing ring is disposed within the groove, such that the sealing ring is provided at least at a side facing away from the root front surface, proximate an outer circumference of the at least one shim plate, further wherein the sealing ring is configured to attach to a hub or bearing of the wind turbine; and
- as a function of the attaching, sealing the at least one bore from lubricant entering an area of the bolt, wherein the sealing ring surrounds the at least one bore at the recess on the root front surface;
wherein a shape of the at least one shim plate inserted into the recess is unchanged as a function of repairing the root.

* * * * *